(12) United States Patent
Sato

(10) Patent No.: US 11,194,694 B2
(45) Date of Patent: Dec. 7, 2021

(54) NETWORK CLIENT AND METHOD THEREFOR

(71) Applicant: CANON KABUSHIKI KAISHA, Tokyo (JP)

(72) Inventor: Shogo Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 16/675,762

(22) Filed: Nov. 6, 2019

(65) Prior Publication Data

US 2020/0159640 A1 May 21, 2020

(30) Foreign Application Priority Data

Nov. 20, 2018 (JP) .............................. JP2018-217082

(51) Int. Cl.
*G06F 15/173* (2006.01)
*G06F 11/34* (2006.01)
*G06F 11/30* (2006.01)

(52) U.S. Cl.
CPC ...... *G06F 11/3495* (2013.01); *G06F 11/3006* (2013.01); *G06F 11/3065* (2013.01)

(58) Field of Classification Search
None
See application file for complete search history.

(56) References Cited

U.S. PATENT DOCUMENTS

| | | | |
|---|---|---|---|
| 2002/0083168 A1* | 6/2002 | Sweeney | G06F 11/3466 709/224 |
| 2003/0226059 A1* | 12/2003 | Braun | G06F 11/3055 714/20 |
| 2005/0028171 A1* | 2/2005 | Kougiouris | G06F 11/3476 719/318 |
| 2013/0198272 A1* | 8/2013 | Shionoya | G06F 11/302 709/203 |
| 2018/0276266 A1* | 9/2018 | Diwakar | H04L 43/0811 |
| 2019/0289479 A1* | 9/2019 | Simms | H04W 24/02 |

FOREIGN PATENT DOCUMENTS

JP 2011-118610 A 6/2011

* cited by examiner

*Primary Examiner* — Brian Whipple
*Assistant Examiner* — Gregory P Tolchinsky
(74) *Attorney, Agent, or Firm* — Canon U.S.A., Inc. IP Division

(57) ABSTRACT

A network client includes a correspondence table between collection types set by a management server and event collection modules in the client, and a correspondence table between the collection types set by the management server and event types in the client, and switches output of an event log in units of a collection type requested by the management server.

8 Claims, 15 Drawing Sheets

FIG.8

```
{
  "COLLECTION REQUEST": {
    "COLLECTION REQUEST LIST": [
      {
        "COLLECTION TYPE": ["Basic"],
        "EVENT ACQUISITION TRIGGER": "AT STARTUP"
      },
      {
        "COLLECTION TYPE": ["Job", "Diagnosis"],
        "EVENT ACQUISITION TRIGGER": "IMMEDIATELY"
      }
    ]
  }
}
```

FIG.12

```
{
  "COLLECTION REQUEST": {
    "COLLECTION REQUEST LIST": [
      {
        "COLLECTION TYPE": ["Basic"],
        "EVENT ACQUISITION TRIGGER": "EVERY TWO HOURS"
      },
      {
        "COLLECTION TYPE": ["HiPriority"],
        "EVENT ACQUISITION TRIGGER": "EVERY THREE HOURS"
      }
    ]
  }
}
```

NETWORK CLIENT AND METHOD THEREFOR

BACKGROUND

Field

The present disclosure relates to a technology to collect log information in a system including a network client.

Description of the Related Art

In recent years, necessity of monitoring a state of an apparatus (network client) on a network and performing rapid repair, appropriate maintenance, detection of a sign of failure, and improvement of a function installed in the apparatus has increased. To meet such necessity, a system is well-known in which the operating network client transmits various kinds of logs to a log management server through the Internet, and the log management server analyzes the logs and performs feedback. In such a system, the log management server analyzes logs included in collected log information, and provides various services such as maintenance and feedback to a customer based on a result of the analysis.

The apparatus that transmits the log to the log management server is operated in a customer environment, and the log may include personal information of the customer depending on a type of the log. Therefore, it is necessary to obtain customer agreement about the type of the log to be collected. The agreement is obtained for each service provided to the customer, so that it is necessary to switch the log acquired for the apparatus depending on the provided service. A system discussed in Japanese Patent Application Laid-Open No. 2011-118610, uses a technology to make a setting for log acquisition, for each error that occurs in an application of a mobile terminal.

On the other hand, the information as a source of each log is output in different formats through different interfaces, for each module of a legacy system that has been installed in the apparatus before the system for transmitting/feeding back the logs is introduced. Therefore, different event collection modules are prepared for respective legacy modules, and each of the logs is output after being shaped.

SUMMARY

It has now been determined that conventional technologies to collect log information suffers from issues, for example, in that in a case where the log output in a unit of the event collection module created for each existing module within the device is switched, switching on a unit basis of a log, which is necessary for the service newly added in the log management se cannot be dealt with. For example, in the technology discussed in Japanese Patent Application Laid-Open No. 2011-118610, a log to be acquired is switched for each error which has occurred in the application, in a unit of the module operating within the device, and cannot solve the aforementioned issues. Accordingly, a system becomes necessary in which the log management server switches the log to be collected, on a unit basis different from the unit of the module operating within the device.

In consideration of the above-discussed issues, according to an aspect of the present disclosure, a network client includes a plurality of collectors collecting event information about a detected event, and each of the collectors manages a first table that represents correspondence relationship between collection types and event types. The network client includes at least one memory storing instructions, and at least one processor executing the instructions causing the network client to manage a second table representing correspondence relationship between the collection types and at least any of the plurality of collectors, in a case where an event collection request designating a collection type and an acquisition trigger is received from an external system, specify one or more collectors corresponding to the collection type designated by the event collection request, with reference to the second table, and instruct the specified one or more collectors to collect event information based on the collection type and the acquisition trigger. Each of the specified one or more collectors performs enablement processing to collect the event information of an event type corresponding to the collection type included in the instruction, according to the acquisition rigger included in the instruction, with reference to the first table. After the enablement processing is performed, the event information collected by each of the collectors is transmitted through a network.

Further features of the present disclosure will become apparent from the following description of exemplary embodiments with reference to the attached drawings.

BRIEF DESCRIPTION OF THE DRAWINGS

FIG. 8 illustrates an example of an event collection request setting file.

FIG. 12 is an example of an event collection request setting file according to the second exemplary embodiment.

DESCRIPTION OF THE EMBODIMENTS

Exemplary embodiments of the present disclosure are described below with reference to drawings.

Figure 1:
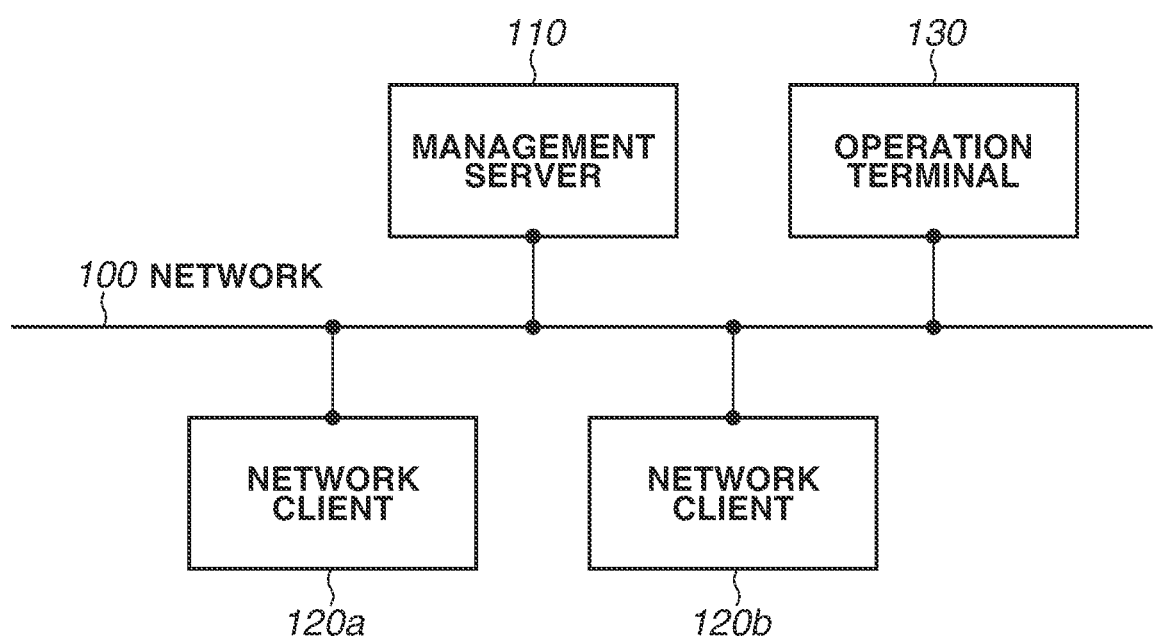
FIG. 1 is a system configuration diagram illustrating an entire system.

A first exemplary embodiment is described below. FIG. 1 is a system configuration diagram illustrating an entire system according to the present exemplary embodiment. A management server 110 that is an external system described in the present exemplary embodiment, network clients 120, and an operation terminal 130 are connected to a network 100.

Each of the network clients 120 includes a communication function to notify the management server 110 of an event in a device in a form of a history event. Further, the management server 110 includes a function to store the events notified from the plurality of network clients 120 in an internal storage. The information accumulated in the storage is used for analysis of operation monitoring information.

In the present exemplary embodiment, the management server 110 is achieved by a general information processing apparatus such as a computer that includes a data storage, a function of information processing calculation, and a function of network communication, or a cloud service including the equivalent functions.

As each of the network clients 120, a multifunctional peripheral that achieves a plurality of functions such as a copy function and a facsimile function is described as an example. Each of the network clients 120 includes a function to notify the management server 110 of a history of transition to/return from a power-saving state, and a history of transition to/return from an abnormal state such as an error occurrence state, in addition to an execution history of the above functions.

The management server 110 is provided with a web application, and the operation terminal 130 accesses the management server 110 with use of a web browser through the network 100 to change a setting of the management server 110.

Figure 2:
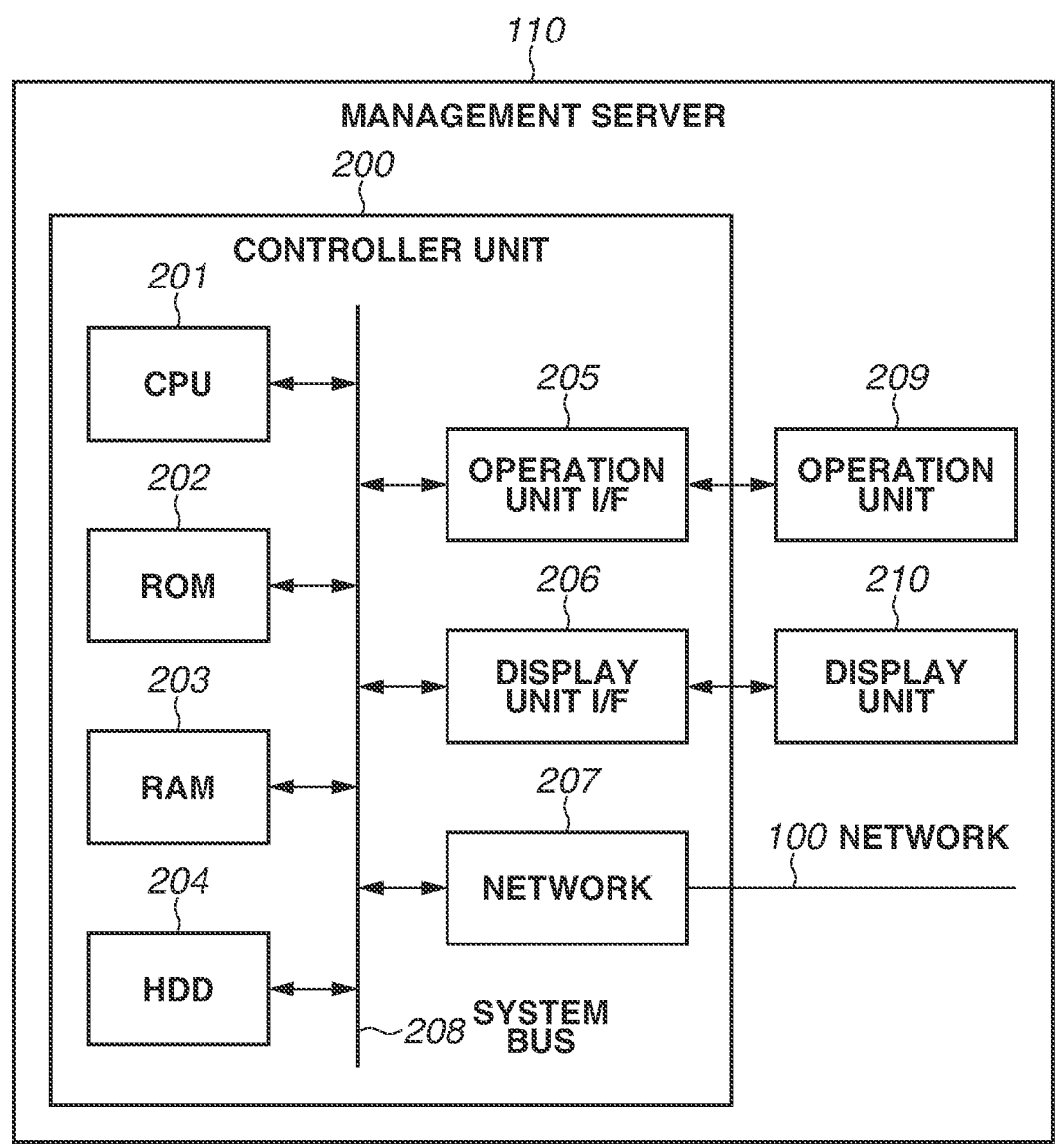
FIG. 2 is a block diagram illustrating a configuration of a management server.

FIG. 2 is a block diagram illustrating a configuration in a case where the management server 110 according to the present exemplary embodiment is achieved by a general information processing apparatus such as a computer. The management server 110 includes a controller unit 200, an operation unit 209, and a display unit 210. The controller unit 200 includes a central processing unit (CPU) 201. The CPU 201 starts up an operating system (OS) through a boot program stored in a read only memory (ROM) 202.

The CPU 201 executes, on the OS, application programs stored in a hard disk drive (HDD) 204, to execute various kinds of processing. A random access memory (RAM) 203 is used as a work area of the CPU 201.

The HDD 204 stores the above-described application programs and data of setting, and a history. An operation unit interface (I/F) 205, a display unit I/F 206, and a network 207 are connected to the CPU 201 through a system bus 208 in addition to the ROM 202 and the RAM 203. The operation unit I/F 205 is an interface with an operation unit 209 that includes a mouse and a keyboard. The operation unit I/F 205 transmits information input by a user through the operation unit 209, to the CPU 201. The display unit I/F 206 outputs image data to be displayed on a display unit 210 including a display, to the display unit 210. Further, the network 207 is an I/F for connecting to the network 100, and performs input/output of information from/to each apparatus on the network 100 through the network 100.

Figure 3:
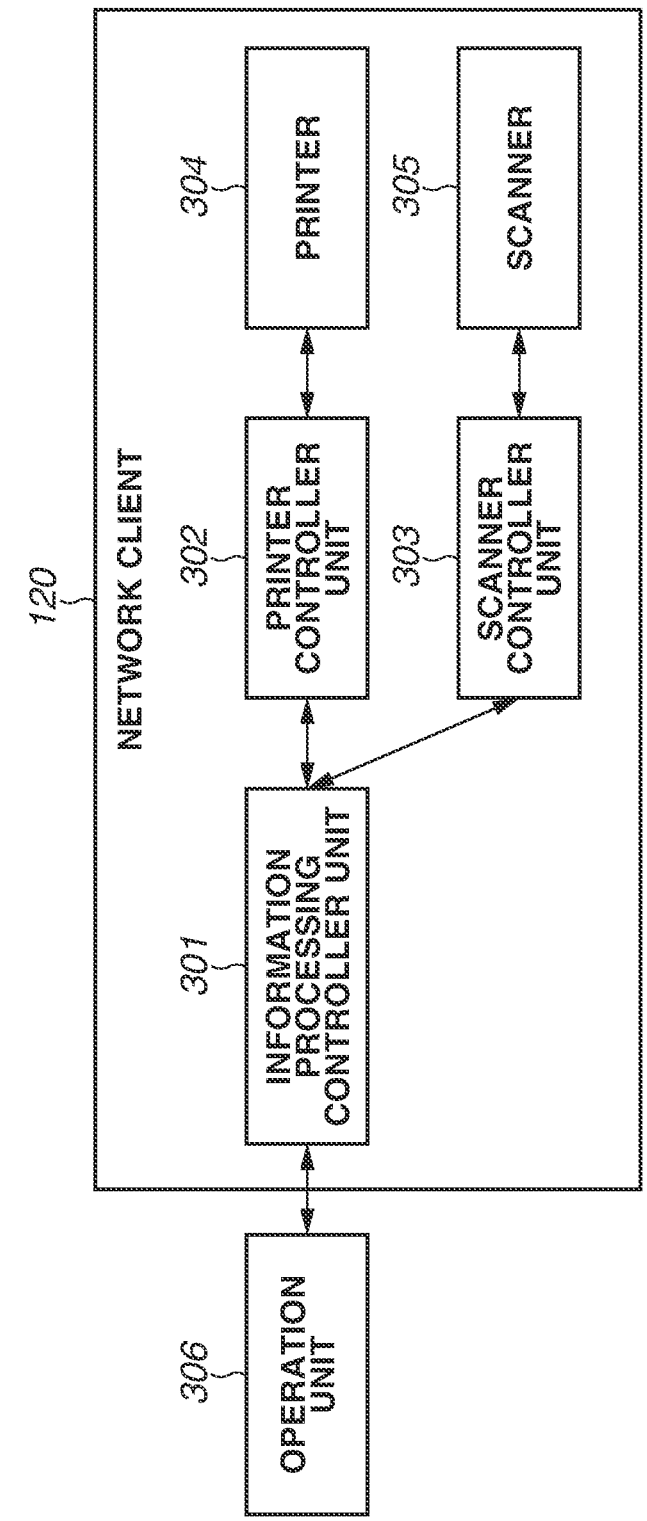
FIG. 3 is a block diagram illustrating an entire configuration of a network client.

FIG. 3 is a block diagram illustrating a configuration of each of the network clients 120 according to the present exemplary embodiment. Each of the network clients 120 is a multifunctional peripheral that includes an information processing controller unit 301, a printer controller unit 302, a scanner controller unit 303, a printer 304, a scanner 305, and an operation unit 306. The information processing controller unit 301 is a controller that performs comprehensive information processing control relating to operation of the corresponding network client 120, and is connected to the operation unit 306. The printer controller unit 302 that controls the printer 304 serving as an image output device, and the scanner controller unit 303 that controls the scanner 305 serving as an image input device are further connected to the information processing controller unit 301.

Figure 4:
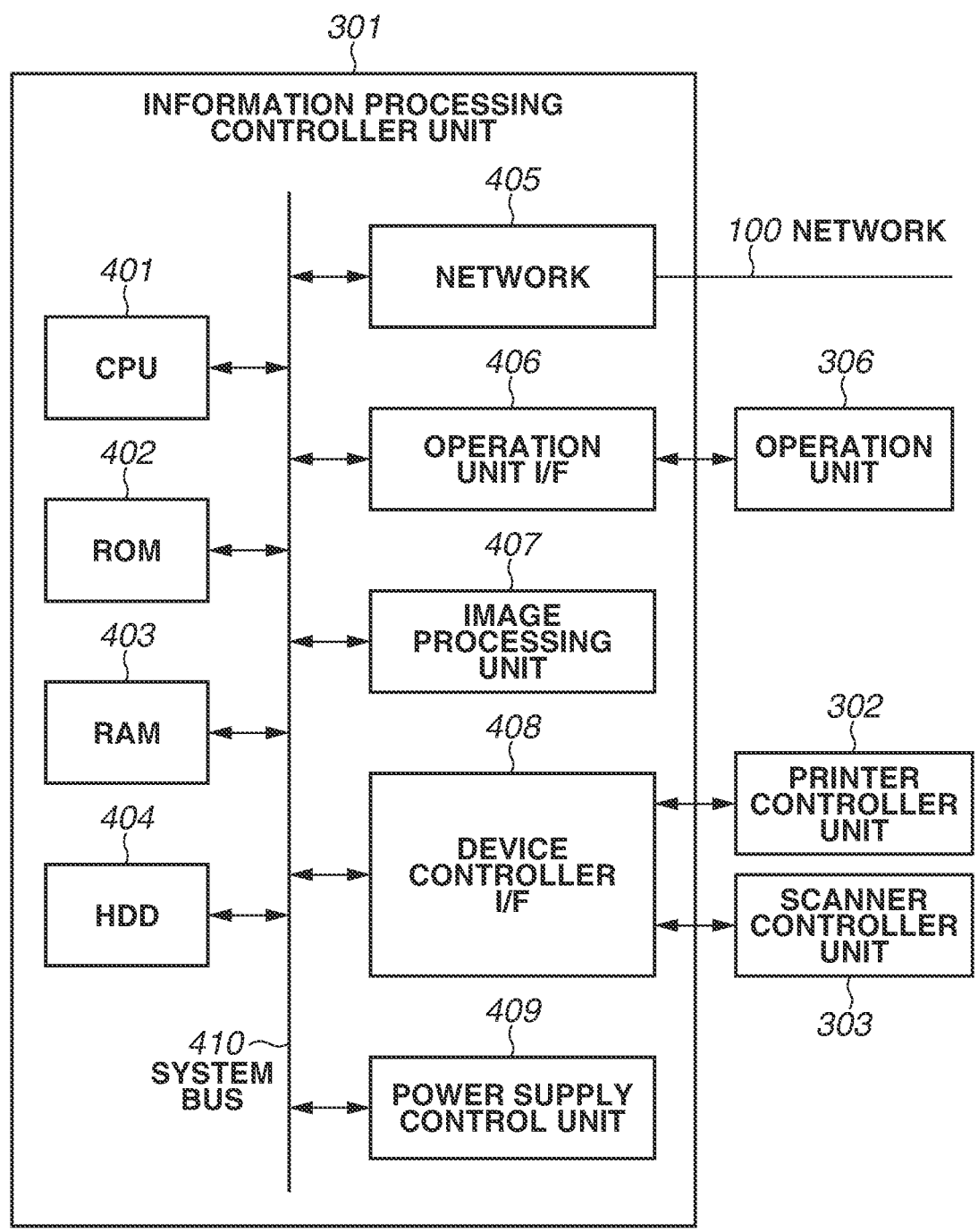
FIG. 4 is a block diagram illustrating a configuration of an information processing controller unit.

FIG. 4 is a block diagram illustrating a configuration of the information processing controller unit 301 in each of the network clients 120 according to the present exemplary embodiment. The information processing controller unit 301 includes a CPU 401. The CPU 401 starts up an OS through a boot program stored in a ROM 402. The CPU 401 executes, on the OS, application programs stored in an HDD 404, to execute various kinds of processing, A RAM 403 is used as a work area of the CPU 401.

The RAM 403 provides a work area and an image memory area for temporal storage of image data.

The HDD 404 stores the above-described application programs, image data, various kinds of setting values, and a history.

An operation unit I/F 406, a device controller I/F 408, a network 405, an image processing unit 407, and a power supply control unit 409 are connected to the CPU 401 through a system bus 410 in addition to the ROM 402 and the RAM 403.

The operation unit I/F 406 is an interface with the operation unit 306 including a touch panel, and outputs image data to be displayed on the operation unit 306, to the operation unit 306. Further, the operation unit I/F 406 transmits information input by the user through the operation unit 306, to the CPU 401.

The scanner controller unit 303 and the printer controller unit 302 are connected to the device controller I/F 408, and the device controller I/F 408 performs conversion of synchronous image data and asynchronous image data.

The network 405 is an I/F for connecting to the network 100, and performs input/output of information from/to each apparatus on the network 100 through the network 100.

The image processing unit 407 performs processing of an image to be output to the printer 304, processing of an image input from the scanner 305, and processing such as image rotation, image compression, resolution conversion, color space conversion, and tone conversion. The power supply control unit 409 performs power ON/OFF control to control power supply to the entire device, and also controls transition to a power-saving state other than a normal energization state, and return to the normal state.

Figure 5:
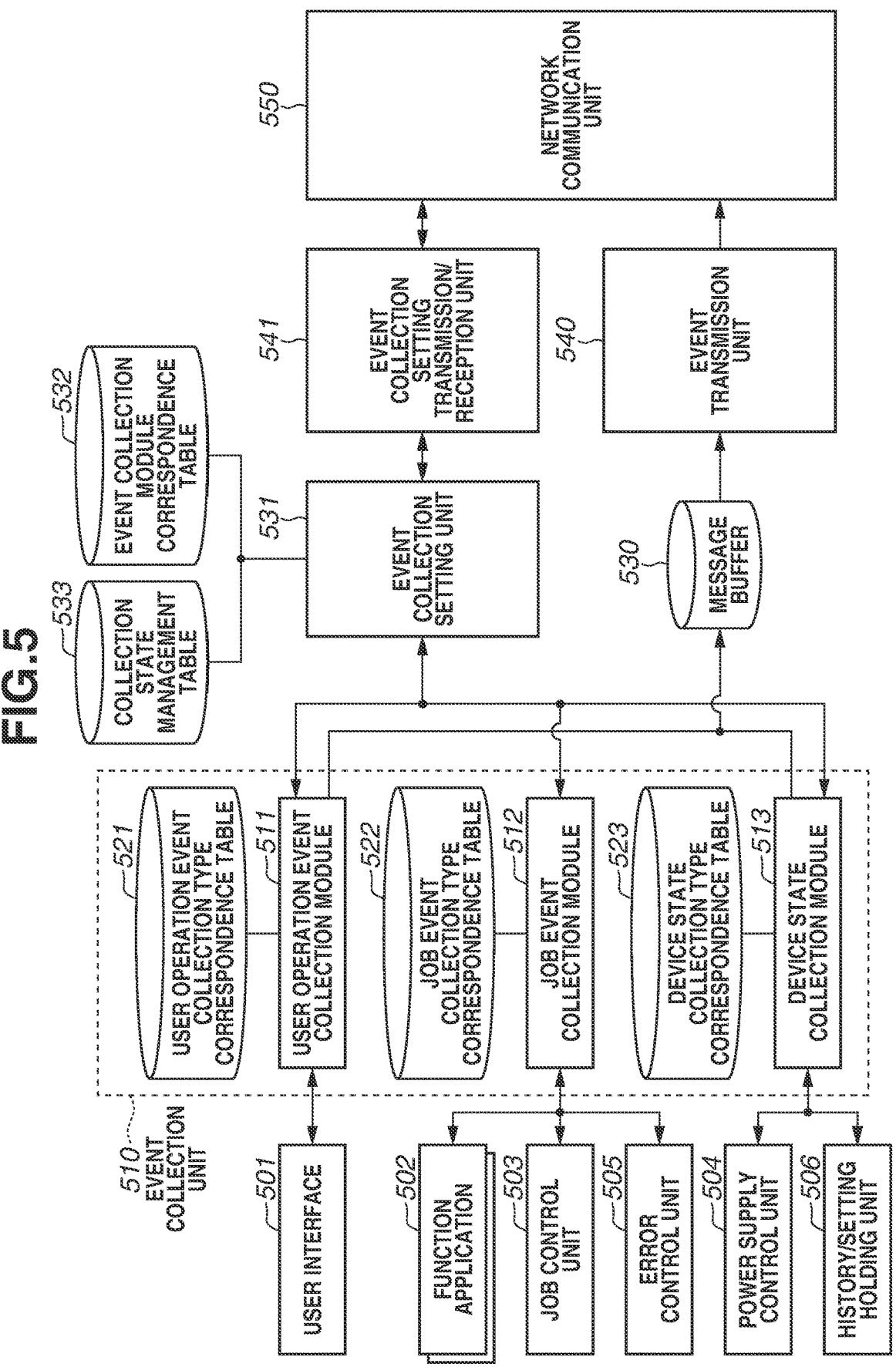
FIG. 5 is a software block diagram of the network client.

FIG. 5 is a software block diagram of each of the network clients 120 according to the present exemplary embodiment. In the present specification, the software is stored in any of the storage units of the RAM 403, the HDD 404, and the ROM 402, and the CPU 401 executes the software to achieve the functions. The network clients 120 are a multifunctional peripheral, and the software achieving a scan function, a print function, and the other various functions using the network and the memory storage is operated in each of the network clients 120.

A user interface 501 has a function to display a screen to be operated by the user on the operation unit 306, and a function to transmit a motion operated by the user to the software.

A plurality of function applications 502, such as ones for copying, printing, and mail transmission, are provided within the device. The application functions of the multifunctional peripheral are operated according to an instruction from the user through the operation unit 306, data reception through the network 405, or the like, as a trigger.

A job control unit 503 receives an instruction from each of the function applications 502 to control the printer controller unit 302 and the scanner controller unit 303 to perform scanning and printing.

A power supply control unit 504 controls the power supply control unit 409 in conjunction with the state of the software inside the apparatus to perform transition between the normal energization state and the power-saving state.

An error control unit 505 receives notification of an abnormal state which mainly occurs in the job control unit 503, the printer control unit 302, the scanner controller unit 303 and stops the entire system or instructs degeneracy operation.

A history/setting holding unit 506 manages nonvolatile information inside the device. The history/setting, holding unit 506 holds setting necessary to control the multifunctional peripheral and the job, and summarizes and saves a history of operation executed by the user, a job execution result, and error occurrence. Further, log information retained for analysis and debug when failure of the system occurs is also saved in the history/setting holding unit 506. The actual entity of the nonvolatile information is held by the HDD 404.

An event collection unit 510 includes three event collection modules, namely, a user operation event collection module 511, a job event collection module 512, a device state collection module 513. The event collection unit 510 further includes event collection type correspondence tables (521 to 523) as data of the modules.

Each of the event collection modules (511 to 513) has a function to normalize information generated by state transition in each of the units (501 to 506) of the device in a form of an event, and a function to store the normalized event in a message buffer 530, in order to transmit the information to the management server 110. The message buffer 530 is located in the HDD 404, and the normalized event is stored in a nonvolatile area. The normalization is performed using a universal format such as JavaScript Object Notation (JSON), extensible markup language (XML), comma-separated values (CSV), and YAML ain't markup language (YAML). Various information is added depending on a type of the event, in addition to basic information including an event name, an occurrence time, and a serial number of an information processing apparatus. The event collection unit 510 dynamically acquires the added information by referring to the nonvolatile information in the history/setting holding unit 506, or from the state of each of the units (501 to 506) of the device. Specific operation is described below.

The user operation event collection module 511 acquires information of operation performed by the user, from the user interface 501.

The job event collection module 512 receives transition of the job execution state, from the job control unit 503, and collects information at the time of the transition from the function applications 502 and the job control unit 503. Further, the job event collection module 512 receives notification of occurrence of abnormality inside the device, from the error control unit 505, and collects information about error occurrence factor.

The device state collection module 513 collects the information when the power-saving state of the device is changed, and collects the history and change information of the setting, from the power supply control unit 504 and the history/setting holding unit 506.

An event transmission unit 540 reads information from the message buffer 530 when an event is issued through detection of writing to the message buffer 530, and transmits the event to the management server 110 through a network communication unit 550. The network communication unit 550 performs communication using the network 405.

Further, in response to a collection setting request received through an event collection setting transmission/reception unit 541, the event collection setting unit 531 identifies the corresponding event collection modules (511 to 513) from an event collection module correspondence table 532, and instructs collection setting. Each of the event collection modules (511 to 513) acquires an event type corresponding to a collection type instructed by the corresponding collection type correspondence table (521 to 523). Further, each of the event collection modules (511 to 513) instructs the corresponding units (501 to 506) within the device to activate setting to collect event information log. The event collection setting unit 531 temporarily stores the setting result in a collection state management table 533, and notifies the setting result to the management server 110 through the event collection setting transmission/reception unit 541 and the network communication unit 550. The detail of the processing is illustrated with specific table example at the time of describing flowcharts of FIGS. 7A to 7C.

[Event Transmission Processing]

Figure 6:
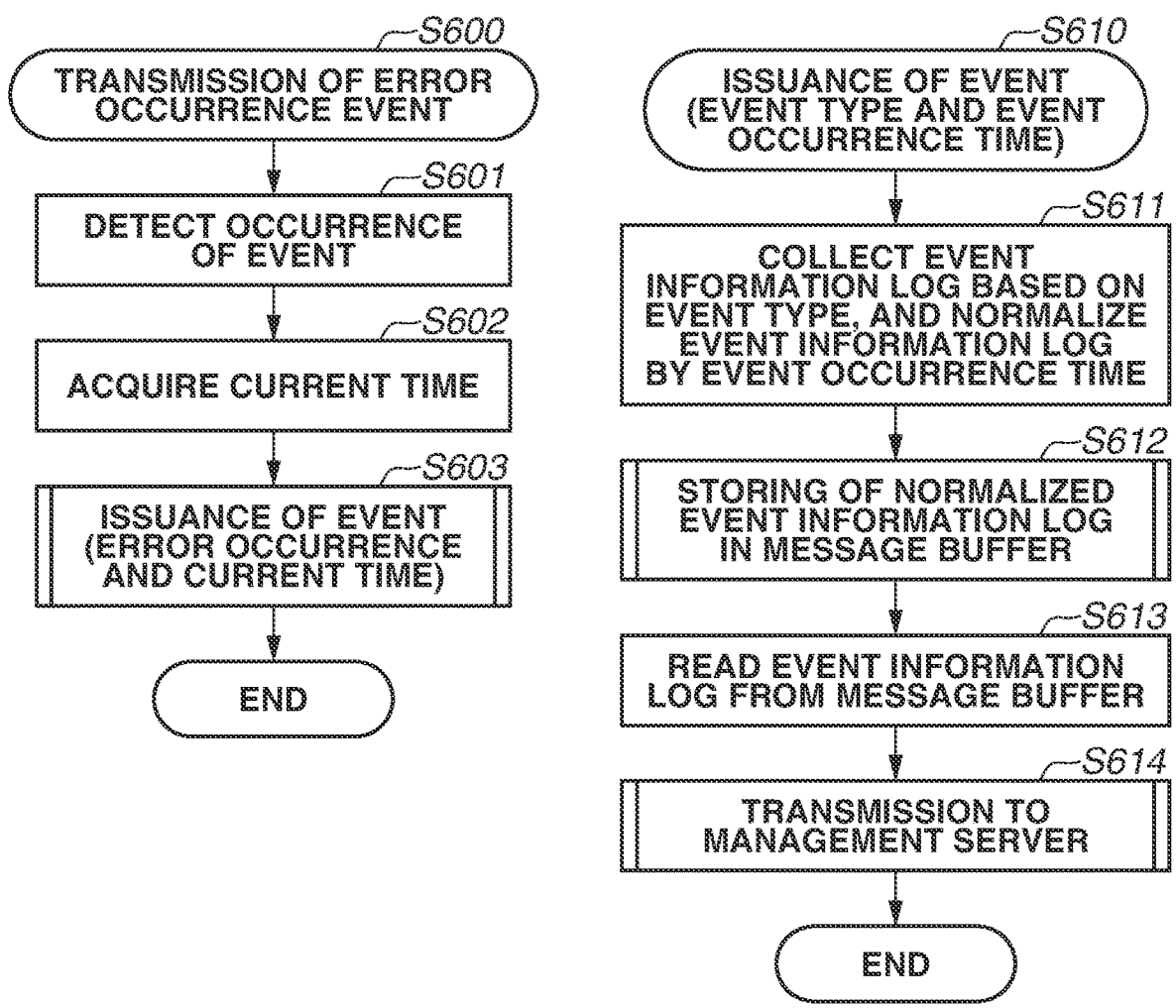
FIG. 6 is a set of flowcharts illustrating flow from detection of occurrence of an event until transmission to the management server.

FIG. 6 is a set of flowcharts illustrating flow of processing for transmitting the event information log to the management server 110 when various events occur in the device of each of the network clients 120 according to the present exemplary embodiment.

A first flowchart of the set beginning at step S600 is described with respect to an error occurrence event as an example. The first flowchart beginning at step S600 is executed only in a case where the event collection setting unit 531 has made the setting such that the error occurrence event is immediately collected when the event occurs.

In step S601, the event collection unit 510 detects occurrence of an error. In step S602, the event collection unit 510 acquires the current time. In step S603, the event collection unit 510 notifies a subroutine, that issues the event, of occurrence of an error event, and transmits the event to the management server 110 by performing processing using the acquired current time as an argument.

The subroutine is described in detail with reference to the following second flowchart of the set beginning at step S610.

In step S611, the event collection unit 510 collects, from the modules in the device, previously associated event information log corresponding to the type of the received event. For example, when the event is an error occurrence event, an error code, a name of a part in which the error has occurred, and a counted number of fed sheets are collected. For example, in a case where the event is a completion event of a copy job, an executing username, whether color or monochrome, the number of scanned sheets, and the number of printed sheets are collected. The event information log is normalized in a universal format such as JSON with use of the provided time information in addition to the collected information.

In step S612, the event collection unit 510 stores the normalized event information log in the message buffer 530. The contents to be transmitted to the management server 110 are fixed at this time.

In step S613, the event transmission unit 540 asynchronously detects writing of the event information log in the message buffer 530, and reads the written event information log from the message buffer 530.

In a subroutine in step S614, the event transmission unit 540 performs transmission operation to the management server 110. At this time, the transmission operation including authentication operation to the management server 110 and retry processing in communication error is performed until transmission completion. The management server 110 stores the received event information log in a storage.

The information logs of the various kinds of events occurred in each of the network clients 120 are transmitted to and collected by the management server 110 in the above-described manner.

[Event Collection Setting Processing]

Figure 7A:
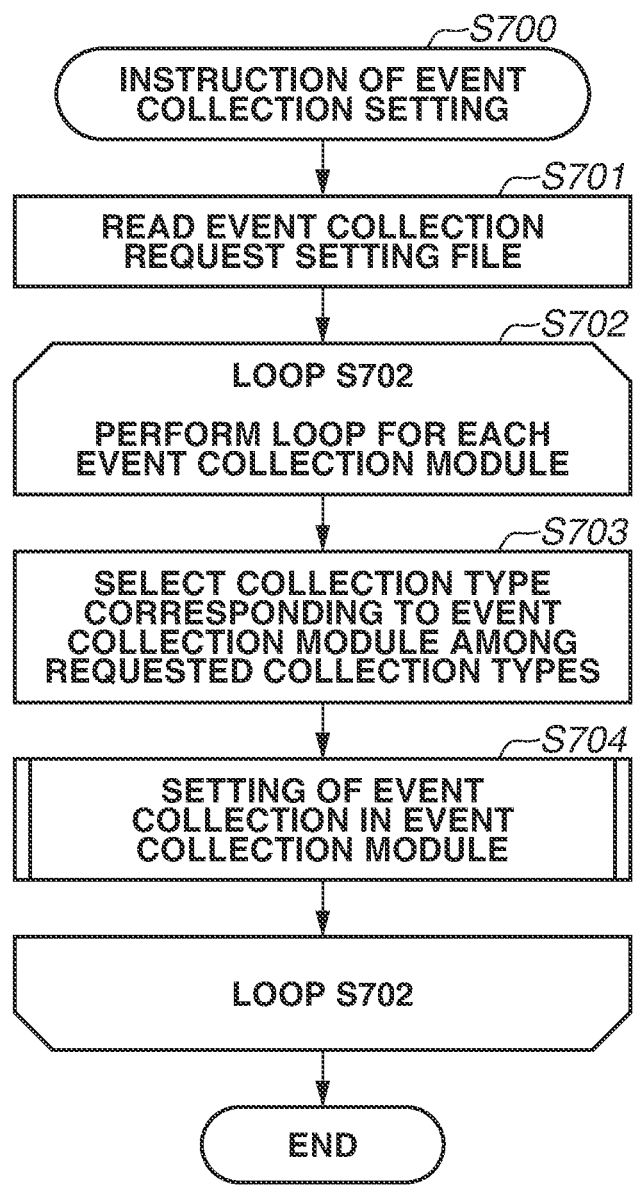
FIG. 7A is a flowchart illustrating event collection setting processing.
Figure 7B:
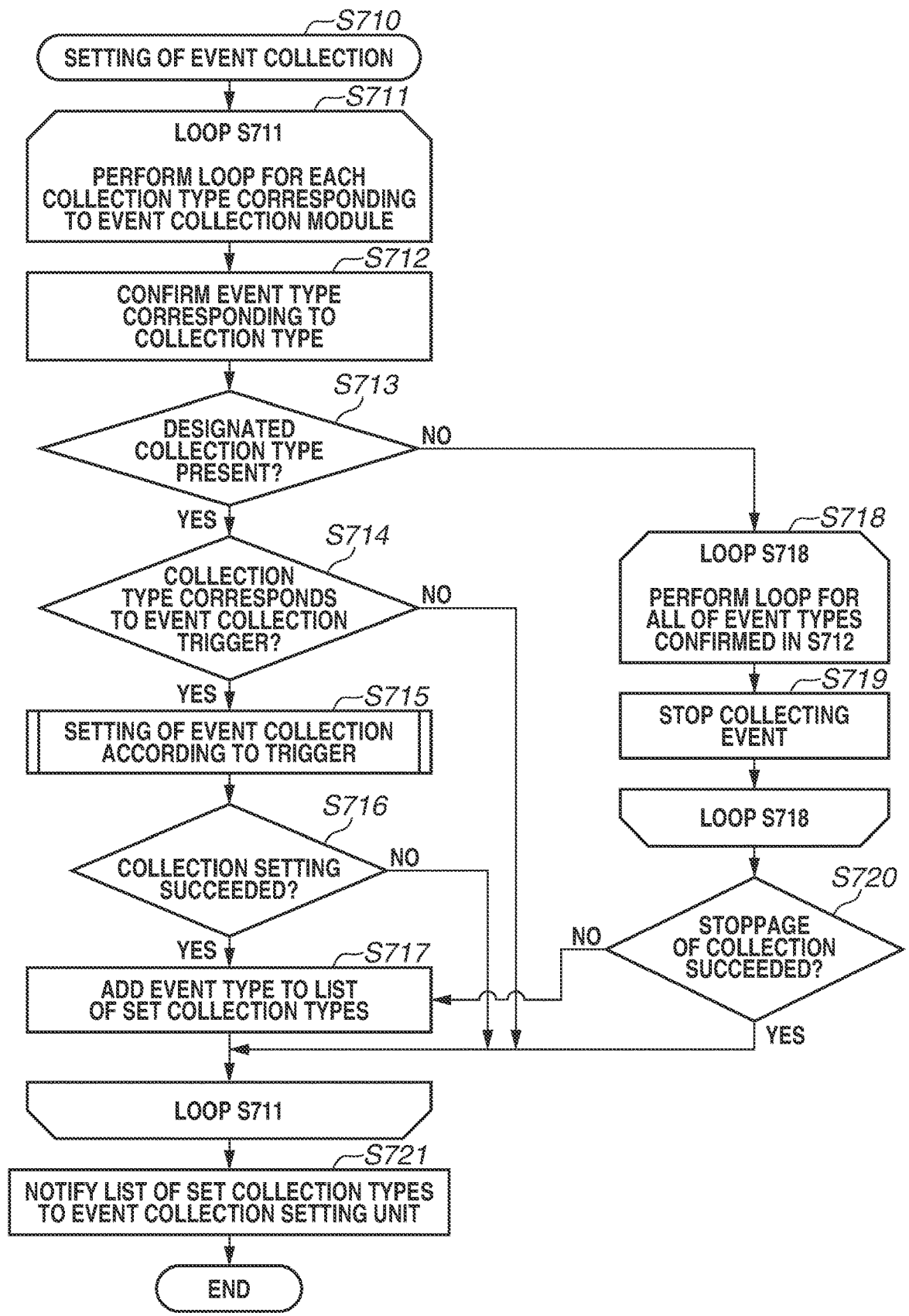
FIG. 7B is a flowchart illustrating the event collection setting processing.
Figure 7C:
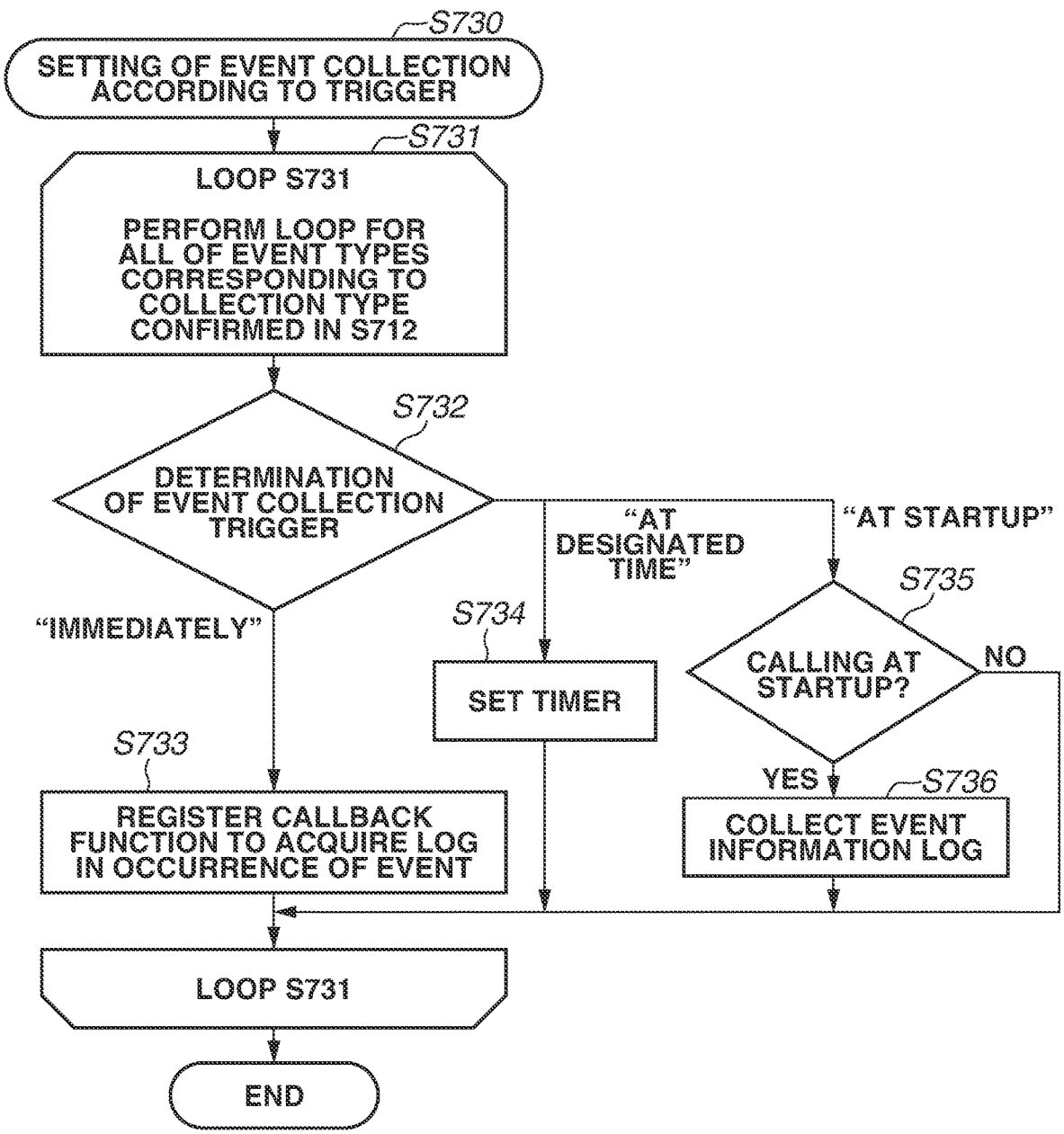
FIG. 7C is a flowchart illustrating the event collection setting processing.

FIGS. 7A to 7C are flowcharts of event collection setting processing in which each of the network clients 120 according to the present exemplary embodiment receives the event collection request from the management server 110 through the network 100, and reflects the event collection request.

<Processing to Read Instruction of Collection Type Setting>

A flowchart 700 illustrates processing by the event collection setting unit 531 to read an event collection setting file in which instruction of the collection type setting is stored. The processing is performed when the event collection setting transmission/reception unit 541 receives instruction of the event collection type setting from the network communication unit 550, and stores the event collection request setting file in the HDD 404. Further, the processing is also performed when each of the network clients 120 reads the event collection request setting file already received, at startup.

In step S701, the event collection setting unit 531 reads an event collection request setting file 801 received by the event collection setting transmission/reception unit 541. In the event collection request setting file 801, a "collection type" representing a type of an event, the event information log of which is to be collected, and an "event acquisition trigger" indicating a time when the event information log is to be collected are described as illustrated in FIG. 8. The event collection request setting file 801 is designated in a universal format such as JSON, XML, CSV, and YAML. The event collection setting unit 531 reads the "collection type" and the "event acquisition trigger" from the event collection request setting file 801.

TABLE 1

Example of Event Collection Module Correspondence Table

| Collection Type | Event Collection Module |
|---|---|
| UI | User Operation Event Collection Module |
| Job | Job Event Collection Module |
| Diagnosis | Device State Collection Module |
| Power | |
| Basic | |

In step S702, loop processing performed in subsequent steps S703 and S704 is started. In the loop processing, processing to confirm the corresponding event collection module from the event collection module correspondence table 532 like an example in Table 1 is performed for each of the event collection modules. Correspondence relationship between the event collection modules and the collection types is previously recorded in the event collection module correspondence table 532.

In step S703, among the requested collection types, collection types corresponding to each of the event collection modules are selected with reference to the event collection module correspondence table 532.

As an example, setting of the device state collection module 513 based on designation by the event collection request setting file 801 in FIG. 8 is described. In the event collection request setting file 801 in FIG. 8, the collection types "Basic", "Job", and "Diagnosis" are set. Referring to Table 1, as the collection types corresponding to the device state collection module 513, the two collection types "Diagnosis" and "Basic" among the above-described three collection types are selected.

In step S704, the event collection is set in the event collection module by designating the "collection types" selected in step S703 and the "event acquisition triggers" corresponding thereto. In the case of the event collection request setting file 801 in FIG. 8, the event collection is set while "immediate" acquisition of the event information log of the collection type "Diagnosis" and acquisition of the event information log of the collection type "Basic" "at startup" are designated with respect to the device state collection module 513. The detail of the processing is described with reference to a flowchart 710.

<Event Collection Setting Processing: S704>

The flowchart 710 in FIG. 7B illustrates the processing in step S704 of FIG. 7A. The flowchart 710 is asynchronously performed when each of the event collection modules (511 to 513) performs collection instruction from the event collection setting unit 531 designating one or more collection types.

TABLE 2

Example of Device State Collection Type Correspondence Table

| Collection Type | Event Type | Event Collection Trigger |
|---|---|---|
| Basic | Basic Configuration Information | At Startup/At Designated Time |
| Diagnosis | Replacement Completion of Replacement Part | Immediately |
| Power | Power ON | Immediately |
| | Power OFF | Immediately |
| | Transition to Sleep | Immediately |
| | Return from Sleep | Immediately |

In step S711, the event collection modules (511 to 513) confirm the corresponding collection types in the respective event collection type correspondence tables (521 to 523), and perform processing in steps S712 to S715 for each of the collection types. The correspondence relationship among the collection types, the event types, and the event collection triggers is recorded in each of the event collection type correspondence tables (521 to 523). In the case of the device state collection module 513, the collection types "Basic", "Diagnosis", and "Power" are read from the device state collection type correspondence table 523 like an example in Table 2, and the loop is performed on each of the collection types.

In step S712, the event type corresponding to the designated collection type is confirmed, and the processing proceeds to step S713. In a case where "immediate" acquisition of the event information log of the collection type "Diagnosis" is designated with respect to the device state collection module 513, the device state collection module 513 confirms that an event corresponding to the collection type "Diagnosis" is an event of "replacement completion of replacement part" in the device state collection type correspondence table 523 as shown as an example in Table 2. In a case where acquisition of the event information log of the collection type "Basic" "at startup" is designated with respect to the device state collection module 513, the device state collection module 513 confirms that an event corresponding to the collection type "Basic" is an event of "basic configuration information".

In step S713, it is determined whether the collection type designated by the event collection setting unit 531 is present in the collection types of the collection type correspondence table of each of the event collection modules. When the collection type is present (YES in step S713), the processing proceeds to step S714. When the collection type is not present (NO in step S713), the processing proceeds to step S718. In the case of the device state collection module 513, the collection types "Diagnosis" and "Basic" designated by the event collection request setting file 801 in FIG. 8 are present. Accordingly, the processing proceeds to step S701. Further, since the collection type "Power" is not present, the processing proceeds to step S714.

In step S714, it is determined whether the "collection type" corresponds to the designated "event collection trigger". When the "collection type" corresponds to the designated "event collection trigger" (YES in step S714), the processing proceeds to step S715. When the "collection type" does not correspond to the designated "event collection trigger" (NO in step S715), the processing proceeds to next loop. In the case of the device state collection module 513, the event of "replacement completion of replacement part" corresponding to the collection type "Diagnosis" corresponds to the designated "immediate" event collection trigger. Accordingly, processing in step S715 is performed.

In step S715, the device state collection module 513 performs enablement processing on the history/setting holding unit 506 in order to immediately acquire the event information log when the event of "replacement completion of replacement part" corresponding to the collection type "Diagnosis" occurs.

The detail of the subroutine relating to the enablement processing of the event collection setting in step S715 is described with reference to a flowchart 730.

In step S716, it is determined whether the enablement processing of the event collection setting has succeeded. When the enablement processing has succeeded (YES in step S716), the collection type is added to a "list of set collection types" that is a list of the operating event collection types, in step S717, and next loop is performed. When the enablement processing has failed (NO in step S716), next loop is performed.

In step S718, processing in step S719 to stop collection of events is performed for each event type corresponding to the collection type to be stopped, on each unit (501 to 506) within the device. After the processing in step S719 to be performed on the event type, which is a collection stop target, ends, and the loop processing in step S718 is performed on all of the event types, the processing proceeds to step S720. In step S720, if the stop processing has succeeded (YES in step S720), the processing proceeds to next loop of the loop processing in step S711. If the stop processing has failed (NO in step S720), the processing proceeds to step S717. In step S717, the collection type of the event type, the stop processing of which has failed, is registered in the "list of set collection types" to be added to the "list of set collection types" which is a list of the event collection types being operated.

In a case of a collection request that the collection type "Power" is not designated as illustrated in FIG. 8, the stop processing is performed on the event types "Power OFF", "Power ON", "Transition to Sleep" and "Return from Sleep".

In step S721, the list of set collection types is notified as the execution result of the enablement processing to the event collection setting unit 531, and the processing ends. In this example, the device state collection module 513 has succeeded in making such a setting that the event information log of the collection type "Diagnosis" is "immediately" acquired and the event information log of the collection type "Basic" is acquired "at startup", which is notified as the list of set collection types to the event collection setting unit 531.

<Event Collection Setting According to Event Collection Trigger: S715>

Next, the subroutine of the setting processing of the event collection according to the event collection trigger in step S715 is described with reference to a flowchart 730 in FIG. 7C.

In step S731, loop processing from step S732 to step S736 is performed on all of "event types" corresponding to the collection type.

In step S732, a type of "event collection trigger" of the collection type, setting of which is requested, is determined. When the type of the "event collection trigger" is "immediately" ("IMMEDIATELY" in step S732), the processing proceeds to step S733. When the type of the "event collection trigger" is "at designated time" (AT DESIGNATED TIME in step S732), the processing proceeds to step S734. When the type of the "event collection trigger" is "at startup" (AT STARTUP in step S732), the processing proceeds to step S735.

(Immediately)

In step S733, a callback function to acquire and shape the event information log when an event occurs is registered in the unit in which an event occurs among the units (501 to 506) within the device, and the processing proceeds to next loop processing in step S731. When the processing is performed, the processing in the flowchart 600 can be performed in a case where an event occurs.

(At Designated Time)

In step S734, a time interval to acquire the event information log and a function to acquire the event information log are registered, and a timer is set in each of the units (501 to 506) in the device. The processing then proceeds to next loop in step S731.

(At Startup)

In step S735, it is determined whether the processing of the flowchart is called at startup of the network client 120. When the processing is called at startup (YES in step S735), the processing proceeds to step S736. Otherwise, the processing proceeds to next loop in step S731.

In step S736, the event information log of the designated collection type is collected. The processing then proceeds to next loop in step S731.

<Processing to Notify Collection Request Reflection Result>

Figure 9:
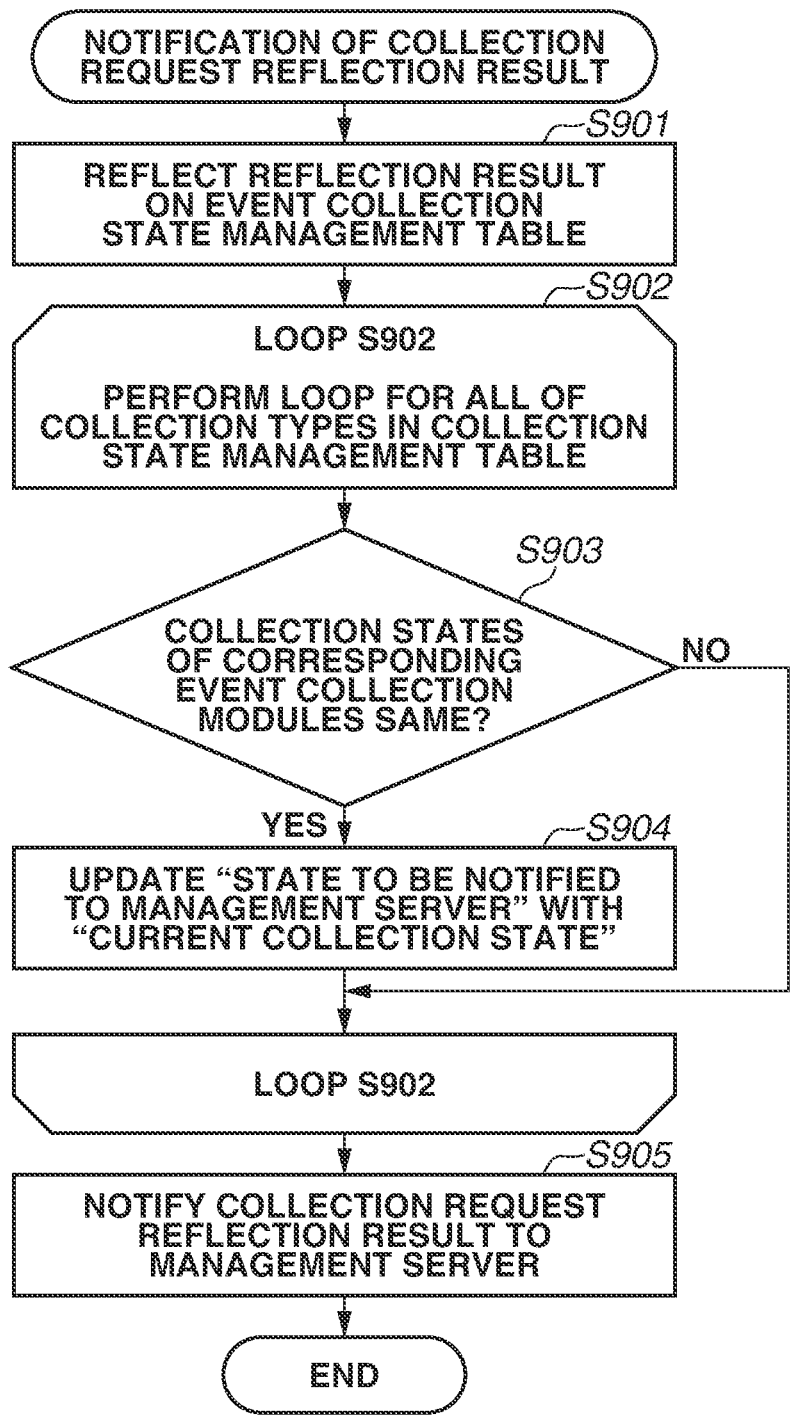
FIG. 9 is a flowchart illustrating processing by an event collection setting unit to notify a reflection result of a collection request.

FIG. 9 is a flowchart illustrating processing by the event collection setting unit 531 to notify a collection request reflection result to the event collection setting transmission/reception unit 541 according to the present exemplary embodiment. The processing is asynchronously performed after the reflection result of the event collection request setting received from the management server 110 is notified as the "list of set collection types" from each of the event collection modules (511 to 513) to the event collection setting unit 531 in step S721. The processing in a case where the event collection request setting file 801 in FIG. 8 is received in the processing of any of the flowcharts of FIGS. 7A to 7C is described below as an example.

TABLE 3

Collection State Management Table (Before Reflection)

| Collection Type | Event Collection Module | Current Collection State | State to be Notified to Management Server |
|---|---|---|---|
| UI | User Operation Event Collection Module | Stopped | Stopped |
| Job | Job Event Collection Module | Stopped | Stopped |
| Diagnosis | Device State Collection Module | Stopped | Stopped |
| Power | | Stopped | Stopped |
| Basic | | Stopped | Stopped |

In the following, notification of the setting that the event information log of the collection type "Diagnosis" is "immediately" acquired, and that the event information log of the collection type "Basic" is acquired "at startup", is received from the device state collection module 513. The processing in which the flow of FIG. 9 is performed once, is first described. Thereafter, notification of the setting that the event information log of the collection type "Job" is "immediately" acquired and the event information log of the collection type "Diagnosis" is "immediately" acquired is received from the job event collection module 512, and the processing in which the flow of FIG. 9 is performed again, is described. Before the processing is performed, the current collection in the collection management table 533 are all in stopped states as illustrated in Table 3, and the collection state management table 533 is updated up to Table 7 from this state.

In step S901, the event collection setting unit 531 receives the reflection result of the event collection request as the "list of set collection types" from each of the event collection modules, and reflects the result in the collection state management table 533. First, when the notification is transmitted from the device state collection module 513, the collection state management table 533 is updated from Table 3 to Table 4.

With respect to the collection type "Diagnosis" in the device state collection module 513, the current collection state is updated with "immediately". With respect to the collection type "Basic", the current collection state is updated with "at startup".

TABLE 4

Collection State Management Table (After Reflection of Current Collection State)

| Collection Type | Event Collection Module | Current Collection State | State to be Notified to Management Server |
|---|---|---|---|
| UI | User Operation Event Collection Module | Stopped | Stopped |
| Job | Job Event Collection Module | Stopped | Stopped |
| Diagnosis | Device State Collection Module | Immediately | Stopped |
| Power | | Stopped | Stopped |
| Basic | | At Startup | Stopped |

In step S902, a loop of processing in steps S903 and S904 is performed for each of the collection types in the collection state management table 533.

In step S903, it is confirmed whether the collection states of all of the event collection modules corresponding to the collection type are the same one another. In a case where the collection states are the same one another (YES in step S903), the processing proceeds to step S04. In a case where the collection states are different from one another (NO in step S903), next loop is performed. In the case of the collection type "Basic", the number of corresponding event collection modules is one. Accordingly, the processing proceeds to step S904.

In step S904, a "state to be notified to management server" is updated with the current collection state, and the processing proceeds to next loop. The state to be notified to management server of the collection type "Basic" is updated from "stopped" to "at startup" as illustrated in Table 5.

Further, in step S903, the collection state of the collection type "Diagnosis" is set to "stopped" in the job event collection module 512 and to "immediately" in the device state collection module 513. Accordingly, the processing proceeds to next loop without performing any processing. The collection states may be different from each other in the following cases. In one case, notification is transmitted earlier from the device state collection module 513 while notification is not transmitted from the job event collection module 512, and a transient state is established, as illustrated in Table 4. In another case, the job event collection module 512 has failed in reflecting the setting of the collection type "Diagnosis". The reflection fails in a case where the history/setting holding unit 506 as a collection source of the event information log performs the collection processing for a large amount of event information log, which causes timeout. Further, a case can be considered where the history/setting holding unit 506 does not operate due to a breakdown, and a procedure to collect the event information log is not performable.

In the case where it is determined in step S903 that the collection states are different from one another, the processing proceeds to next loop without changing the "state to be notified to management server" in the collection state management table 533. In such a case, the "state to be notified to management server" is still being set to "stopped" as illustrated in Table 5.

When no processing is performed in the case where it is determined in step S903 that the collection states are different from one another, notification can be carried out as it is again in a state notified to a cloud in the past. In such a case, it can be notified to the cloud that the setting could not be changed while acquiring the acquirable log. Although one of the event collection modules is operated, the operation does not cause a problem because an instruction allowing the operation has been received from the management server 110. In contrast, in a case where the operating of the plurality of event collection modules is stopped, it can be notified that collection of the event information log could not be stopped, in the same or a similar manner. In this case, one of the event collection modules is still being operated as it is. Accordingly, it is necessary for the management server 110 to retry the event collection request setting or to reject reception of the event information log from the corresponding network client 120.

TABLE 5

Collection State Management Table (After Reflection of State to be Notified to Management Server)

| Collection Type | Event Collection Module | Current Collection State | State to be Notified to Management Server |
|---|---|---|---|
| UI | User Operation Event Collection Module | Stopped | Stopped |
| Job | Job Event Collection Module | Stopped | Stopped |
| Diagnosis | Device State Collection Module | Immediately | Stopped |
| Power Basic | | At Startup | At Startup |

In step S905, the "state to be notified to management server" in the updated collection state management table 533 is written as a reflection result file in a universal format such as JSON, XML, CSV, and YAML. The processing then ends. The event collection setting transmission/reception unit 541 transmits the reflection result file as a response to the management server 110, when notification of a writing event to the reflection result file is received or when a certain time has elapsed after the event collection request setting file is received.

Next, in the case where the event information log of the collection type "Job" is "immediately" acquired and the event information log of the collection type "Diagnosis" is "immediately" acquired from the job event collection module 512, and the flow of FIG. 9 is performed, the processing in step S901 is performed as with the above-described example. As a result, the collection state management table 533 is updated as illustrated in Table 6.

TABLE 6

Collection State Management Table (After Reflection of Current Collection State)

| Collection Type | Event Collection Module | Current Collection State | State to be Notified to Management Server |
|---|---|---|---|
| UI | User Operation Event Collection Module | Stopped | Stopped |
| Job | Job Event Collection Module | Immediately | Stopped |
| Diagnosis | Device State Collection Module | Immediately | Stopped |
| Power Basic | | At Startup | At Startup |

Next, in step S903, the processing proceeds to step S904 because the collection state of the collection type "Diagnosis" is set to "immediately" in the job event collection module 512 and the device state collection module 513, respectively.

In step S904, the state to be notified to management server is updated with the current collection state, and the processing proceeds to next loop. The state to be notified to management server of the collection type "Diagnosis" in Table 4 is updated with "immediately". As a result of continuation of the processing, the collection state management table 533 is finally updated to Table 7.

TABLE 7

Collection State Management Table (After Reflection of State to be Notified to Management Server)

| Collection Type | Event Collection Module | Current Collection State | State to be Notified to Management Server |
|---|---|---|---|
| UI | User Operation Event Collection Module | Stopped | Stopped |
| Job | Job Event Collection Module | Immediately | Immediately |
| Diagnosis | Device State Collection Module | Immediately | Stopped |
| Power Basic | | At Startup | At Startup |

Figure 10:
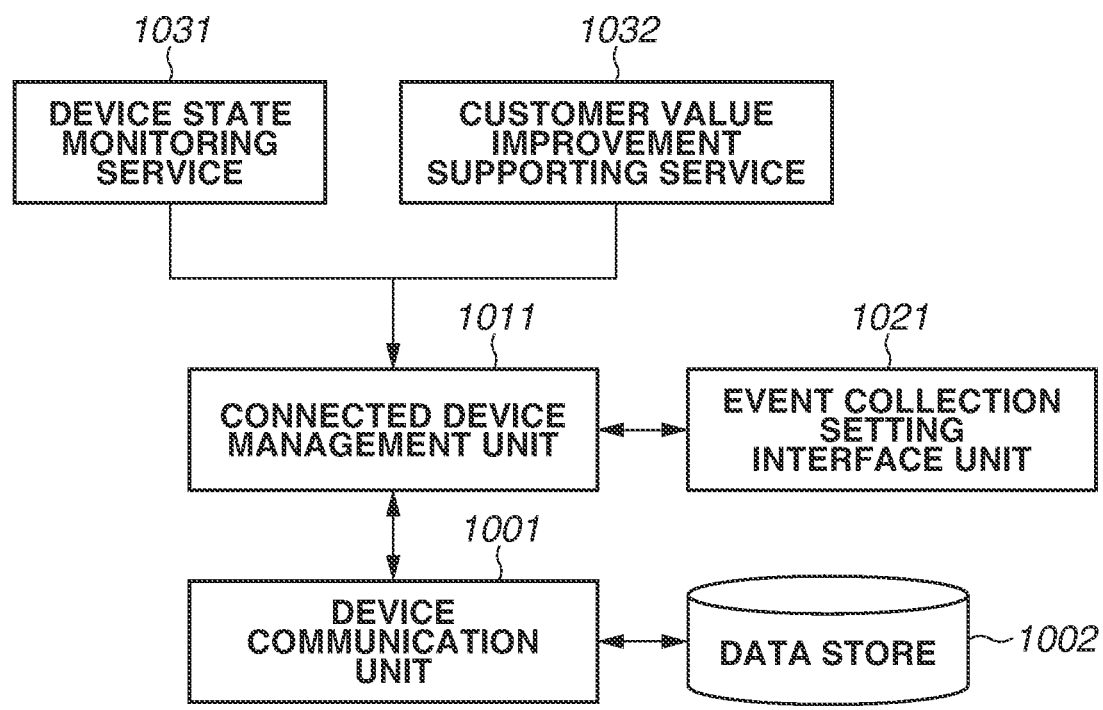
FIG. 10 is a software block diagram of the management server.

FIG. 10 is a block diagram illustrating an example of a software configuration of the management server 110. The present exemplary embodiment is achieved when the CPU 201 executes software stored in any of the storage units of the RAM 203, the HDD 204, and the ROM 202.

A device communication unit 1001 communicates with the network clients 120 through the network 207.

A data store 1002 is a storage of the HDD 204 that stores the event information logs received from the network clients 120 through the device communication unit 1001.

A connected device management unit 1011 manages information of the connected network clients 120 through the device communication unit 1001. The management information includes an identification (ID) of each of the network clients 120, a collection type of the event information log currently collected, and cloud services (1031 and 1032) provided to the network clients 120. The connected device management unit 1011 manages the collection type notified from the network clients 120 to detect occurrence of abnormality in the network clients 120.

An event collection setting interface unit 1021 provides a web page to the operation terminal 130 of the user through the network 207, and receives collection request setting to each of the network clients 120 from the user. When the collection request setting of the event information log is received from the event collection setting interface unit 1021, the collection request setting of the event information log is transmitted to the network client 120 designated by the user, through the device communication unit 1001.

A device state monitoring service 1031 and a customer value improvement supporting service 1032 are examples of the cloud services to be provided to the network clients 120 and the user. These cloud services (1031 and 1032) acquire the event information logs necessary to provide the services, from the data store 1002 through the connected device management unit 1011 and the device communication unit 1001. The device state monitoring service 1031 provides a service to monitor a state of consumption of consumables in each of the network clients 120 and to send out consumables at appropriate timing. The customer value improvement supporting service 1032 provides a service to analyze a job execution state and to make a proposal for improving the customer value.

These cloud services (1031 and 1032) issue a request to collect the event information logs used to provide the services, to the network clients 120 which provide the services, through the connected device management unit 1011 and the device communication unit 1001. For example, in the case of the device state monitoring service 1031, the event information logs of the collection types "Basic", "Job", "Diagnosis", and the like are used. In the case of the customer value improvement supporting service 1032, the event information logs of the collection types "Job", "Power", and the like are used.

In the present exemplary embodiment, each of the network clients 120 transmits the event information log to the management server 110 as illustrated in FIG. 1; however, each of the network clients 120 may transmit the event information log to a different system on the network 100.

According to the present exemplary embodiment, the collection setting of the event collection log can be switched in units of a collection type different from units of the event collection modules of the network clients 120, in conjunction with the cloud services newly provided to the customer.

A second exemplary embodiment is described below. In the first exemplary embodiment, the processing in the case where the event types designated by the collection types are classified so as not to overlap with one another as illustrated in Table 2 has been described; however, in a case where there are a plurality of viewpoints for the classification of the collection types, many-to-one correspondence in which a plurality of collection types corresponds to one event type can be considered. In the second exemplary embodiment, as illustrated in Table 8, even in a case where the plurality of collection types designates one event type, collection setting of the event information log can be appropriately switched in units different from the units of the event collection modules (511 to 513).

TABLE 8

Collection Type Correspondence Table

| Collection Type (Viewpoint 1) | Collection Type (Viewpoint 2) | Event Type |
|---|---|---|
| Basic | High Priority | Basic Configuration Information |
| Diagnosis | | Replacement Completion of Replacement Part |
| Power | Mid Priority | Power ON Power OFF |
| | Low Priority | Transition to Sleep Return from Sleep |

As an example, a case is considered where a collection request that the event information log of the collection type "Basic" is collected "every two hours" and the event information log of the collection type "High Priority" is collected "every three hours" is received as illustrated in FIG. 12 when the device state collection type correspondence table 523 of the device state collection module 513 is in a state illustrated in Table 8. In this case, if timers are separately set with respect to the event type "basic configuration information", the two logs for the two collection types are acquired when processed at timing of every six hours.

Figure 11A:
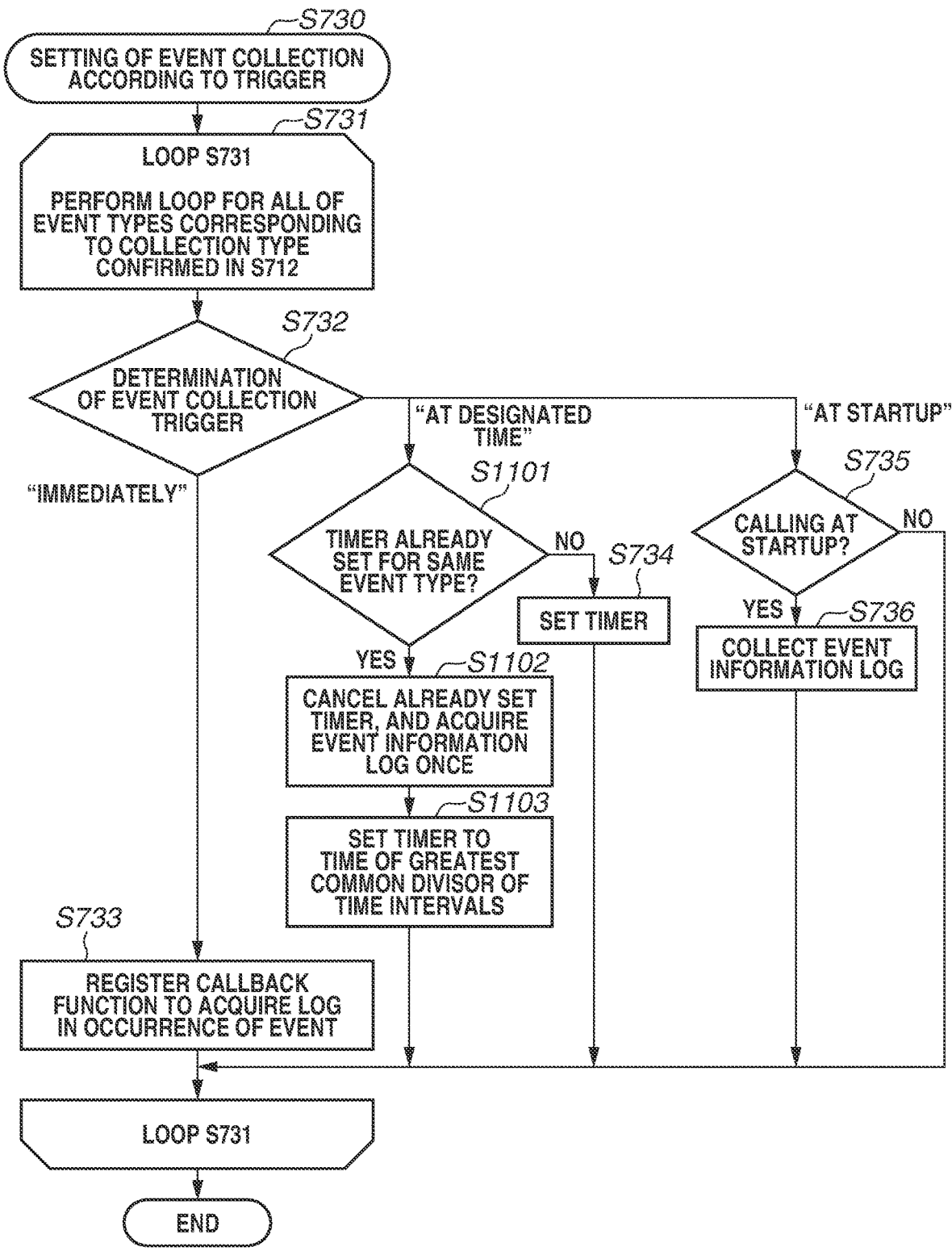
FIG. 11A is a flowchart when an event collection request is received, according to a second exemplary embodiment.

FIG. 11A is a flowchart up to reflecting the collection request when each of the network clients 120 according to the present exemplary embodiment receives the event collection request from the management server 110 through the network 100. Only processing different from the processing in the flow of FIG. 7C described in the first exemplary embodiment is described.

In the case where the event collection trigger is set to "at designated time" in step S732, it is determined in step S1101 whether a timer of the same event type has been already set. When the timer has been already set (YES in step S1101), the processing proceeds to step S1102. When the timer has not been set (NO in step S1101), the processing proceeds to step S734.

In step S1102, the timer already set is canceled, the event information log is acquired once, and the processing proceeds to step S1103, This is because, if a long time has elapsed after setting of the existing timer, resetting of the timer causes next acquisition time of the event information log to be largely delayed from a scheduled start time.

In step S1103, the timer is set to a time of the greatest common divisor of the already set time interval and the newly set time interval, and the processing ends. In the case where the collection request that the event information log of the collection type "Basic" is collected "every two hours" and the event information log of the collection type "High Priority" is collected "every three hours" is received as illustrated in FIG. 12, the timer is set to every hour. At this time, a counter is internally prepared for the set timer, and is initialized to zero. Further, the time intervals are also saved.

Figure 11B:
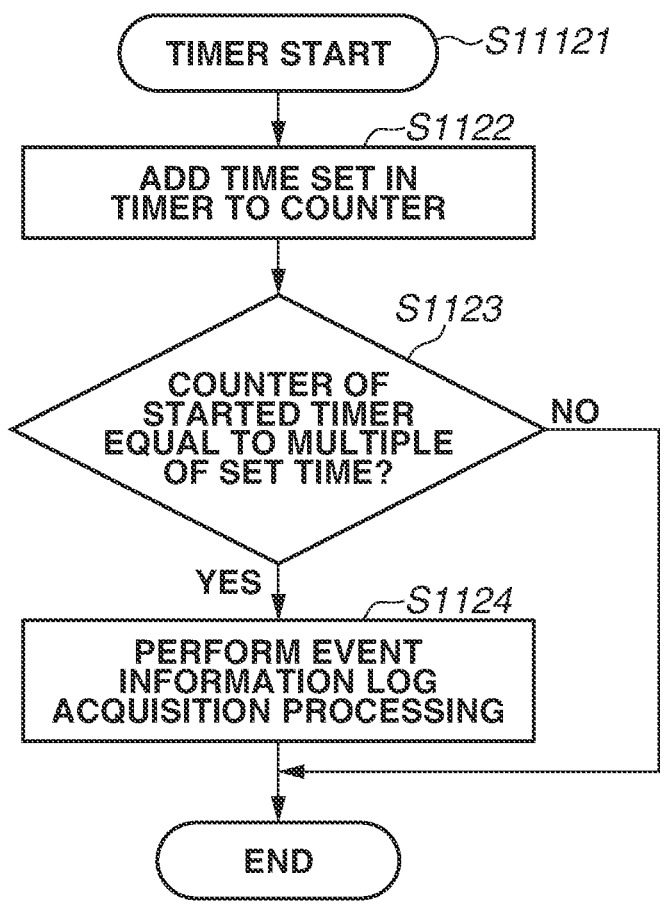
FIG. 11B is a flowchart when the event collection request is received, according to the second exemplary embodiment.

A flowchart 1121 in FIG. 11B is a flowchart in a case where the set timer is started in the second exemplary embodiment.

In step S1122, the time set in step S1103 is added to the counter, and the processing proceeds to step S1123. In the example of FIG. 12, one hour is added.

In step S1123, it is confirmed whether the counter of the started timer is a multiple of the set time. In a case where the counter is a multiple of the set time (YES in step S1123), the processing proceeds to step S1124, and the event information log is acquired. In a case where the counter is not a multiple of the set time (NO in step S1123), the processing ends. In the example of FIG. 12, it is confirmed whether the counter is a multiple of two hours or three hours. More specifically, the event information log of the event type "basic configuration information" is acquired once at a multiple of the time intervals designated by the collection request, like "2, 3, 4, 6, . . . ", without overlapping with one another.

According to the second exemplary embodiment, even in the case where collection of the plurality of collection types is designated with respect to one event type at differ time intervals, it is possible to collect the event information log for any necessary number of times at the time interval of each of the collection types.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-217082, filed Nov. 20, 2018, which is hereby incorporated by reference herein in its entirety.

What is claimed is:

1. A network client comprising:
a plurality of collectors collecting event information the plurality of collectors respectively managing first tables that represents correspondence relationship between collection types and event types;
at least one memory storing instructions; and
at least one processor executing the instructions causing the network client to:
manage a second table representing correspondence relationship between the collection types and at least one of the plurality of collectors;
in a case where an event collection request designating a collection type and an acquisition trigger is received from an external system, specify one or more collectors corresponding to the collection type designated by the event collection request, with reference to the second table; and
instruct the specified one or more collectors to collect event information based on the collection type and the acquisition trigger,
wherein the specified one or more collectors performs enablement processing to collect the event information of an event type corresponding to the collection type included in the instruction, according to the acquisition trigger included in the instruction, with reference to the respective first tables,
wherein, after the enablement processing is performed, the event information collected by each of the collectors is transmitted through a network, and
wherein transmission of event information of an event type corresponding to a collection type that is not designated by the event collection request received from the external system and on which the enablement processing by the plurality of collectors is not to be performed is stopped.

2. The network client according to claim 1, wherein the instructions further cause the network client to transmit the event information collected by each of the collectors, to a system different from the external system through the network, after the enablement processing is performed.

3. The network client according to claim 1, wherein the instructions further cause the network client to transmit a reflection result with respect to the event collection request, to the external system, based on an execution result of the enablement processing by each of the specified one or more collectors.

4. The network client according to claim 3, wherein, in a case where the execution result of the enablement processing represents that the enablement processing has succeeded for all of the event types corresponding to the collection type, a state relating to the collection type succeeded in the enablement processing is transmitted as the reflection result to the external system.

5. The network client according to claim 3, wherein, in a case where the execution result of the enablement processing represents that the enablement processing has failed for at least one event type corresponding to the collection type, a state relating to the collection type before the enablement processing is performed is transmitted as the reflection result to the external system.

6. The network client according to claim 1, wherein, in the first table, a plurality of collection types corresponds to one event type.

7. The network client according to claim 6, wherein, in a case where the plurality of collection types corresponds to one event type, and an acquisition time interval of the event information is set for each collection type, each event information is collected at a multiple of each time interval.

8. A method for use in a network client that includes a plurality of collectors collecting event information the plurality of collectors respectively managing first tables that represents correspondence relationship between collection types and event types, the method comprising:
managing a second table representing correspondence relationship between the collection types and at least one of the plurality of collectors;
in a case where an event collection request designating a collection type and an acquisition trigger is received from an external system, specifying one or more collectors corresponding to the collection type designated by the event collection request, with reference to the second table; and
instructing specified one or more collectors to collect event information based on the collection type and the acquisition trigger,
wherein the specified one or more collectors performs enablement processing to collect the event information of an event type corresponding to the collection type included in the instruction, according to the acquisition trigger included in the instruction, with reference to the respective first tables,
wherein, after the enablement processing is performed, the event information collected by each of the collectors is transmitted through a network, and
wherein transmission of event information of an event type corresponding to a collection type that is not designated by the event collection request received from the external system and on which the enablement processing by the plurality of collectors is not to be performed is stopped.

* * * * *